(12) United States Patent
Dimatteo et al.

(10) Patent No.: US 10,118,345 B2
(45) Date of Patent: Nov. 6, 2018

(54) SYSTEM AND METHOD FOR EVALUATION OF A THREE-DIMENSIONAL (3D) OBJECT DURING FORMATION OF THE OBJECT

(71) Applicant: Xerox Corporation, Norwalk, CT (US)

(72) Inventors: Guido N. Dimatteo, Ontario, NY (US); James A. Dunst, Victor, NY (US); David R. Kamprath, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 287 days.

(21) Appl. No.: 14/742,189

(22) Filed: Jun. 17, 2015

(65) Prior Publication Data
US 2016/0368220 A1  Dec. 22, 2016

(51) Int. Cl.
| | | |
|---|---|---|
| *B29C 64/386* | (2017.01) | |
| *B29C 67/00* | (2017.01) | |
| *G05B 19/4099* | (2006.01) | |
| *G05B 19/418* | (2006.01) | |
| *B33Y 50/02* | (2015.01) | |

(52) U.S. Cl.
CPC ...... *B29C 67/0088* (2013.01); *G05B 19/4099* (2013.01); *G05B 19/41875* (2013.01); *B29C 64/386* (2017.08); *B33Y 50/02* (2014.12); *G05B 2219/32368* (2013.01); *G05B 2219/35134* (2013.01); *G05B 2219/49007* (2013.01)

(58) Field of Classification Search
CPC ............ B29C 67/0088; G05B 19/4099; G05B 19/41875; G05B 2219/32368; G05B 2219/35134; G05B 2219/49007; B33Y 50/02
See application file for complete search history.

(56) References Cited

U.S. PATENT DOCUMENTS

| | | |
|---|---|---|
| 5,917,332 A | 6/1999 | Chen et al. |
| 6,173,070 B1 | 1/2001 | Michael et al. |
| 6,377,865 B1 | 4/2002 | Edelsbrunner et al. |
| | (Continued) | |

FOREIGN PATENT DOCUMENTS

EP     2 584 534 A2    4/2013

OTHER PUBLICATIONS

B. Sun et al., 3D Computational Ghost Imaging, May 15, 2013, 13 pages.*

*Primary Examiner* — Thomas C Lee
*Assistant Examiner* — Tri T Nguyen
(74) *Attorney, Agent, or Firm* — Maginot Moore & Beck LLP

(57) ABSTRACT

A method for evaluating a three-dimensional (3D) object produced by a three-dimensional (3D) object printer includes generating with a scanner a first data file of the 3D object produced by the three-dimensional object printer. The first data file includes data corresponding to an interior surface and an exterior surface of the 3D object. The method further includes comparing the first data file with a second data file. The second data file is used to operate the three-dimensional object printer to produce the 3D object. The method further includes identifying differences between the first data file and the second data file and identifying a process to rectify a defect on the 3D object based on the identified differences to enable evaluation of the production of the 3D object by the three-dimensional object printer.

14 Claims, 3 Drawing Sheets

(56) References Cited

U.S. PATENT DOCUMENTS

| | | | |
|---|---|---|---|
| 7,047,151 B2 | 5/2006 | Chang | |
| 7,457,455 B2 | 11/2008 | Matsui et al. | |
| 7,742,193 B2 * | 6/2010 | Kaltenbach | G06K 5/02 |
| | | | 358/1.9 |
| 8,477,154 B2 | 7/2013 | Davis et al. | |
| 8,837,026 B2 | 9/2014 | Fisker et al. | |
| 8,841,603 B1 * | 9/2014 | Blanton | G01B 11/2518 |
| | | | 250/256 |
| 9,600,929 B1 * | 3/2017 | Young | G06T 17/00 |
| 2002/0050202 A1 * | 5/2002 | Raney | B26D 5/32 |
| | | | 83/559 |
| 2008/0148803 A1 | 6/2008 | Skultety-Betz et al. | |
| 2009/0316966 A1 * | 12/2009 | Marshall | A61B 6/5217 |
| | | | 382/128 |
| 2011/0205583 A1 | 8/2011 | Young et al. | |
| 2012/0290259 A1 | 11/2012 | McAfee et al. | |
| 2013/0235037 A1 | 9/2013 | Baldwin et al. | |
| 2015/0138330 A1 * | 5/2015 | Krishnamoorthi | G06T 7/0016 |
| | | | 348/77 |
| 2015/0197063 A1 * | 7/2015 | Shinar | G06F 17/50 |
| | | | 700/98 |

\* cited by examiner

SYSTEM AND METHOD FOR EVALUATION OF A THREE-DIMENSIONAL (3D) OBJECT DURING FORMATION OF THE OBJECT

TECHNICAL FIELD

This disclosure relates generally to the production of three-dimensional (3D) objects using additive manufacturing systems, and more particularly, to systems for evaluating the production of 3D objects in such systems.

BACKGROUND

Digital three-dimensional object manufacturing, also known as digital additive manufacturing, is a process of making a three-dimensional solid object of virtually any shape from a digital model. Three-dimensional object printing is an additive process in which one or more ejector heads eject successive layers of material to form an object on a substrate. The substrate is supported either on a platform that can be moved three dimensionally by operation of actuators operatively connected to the platform, or the ejector heads are operatively connected to one or more actuators for controlled movement of the ejector heads to produce the layers that form the object. Three-dimensional object printing is distinguishable from traditional object-forming techniques, which mostly rely on the removal of material from a work piece by a subtractive process, such as cutting or drilling. Manufacturing of three-dimensional printed parts using these techniques is ideal for producing small quantities of small and detailed parts.

Defects in the printed 3D object may occur during the production of the 3D object that can result in an inaccurate object. Detection of these errors during the manufacturing process can be problematic because some surfaces cannot be observed after later layers of the object are formed. If these errors could be detected, the manufacture could be adjusted to compensate for the errors. Some previously known systems do not evaluate the production of the object. In these systems, the production of the 3D object with defects can result in a poor quality 3D object or inaccurate reproduction of the 3D object. As such, improvements in the production process that enable evaluation of a 3D object are desirable.

SUMMARY

A new method evaluates a three-dimensional (3D) object produced by a three-dimensional object printer. The method includes generating with a scanner a first data file of the 3D object produced by the three-dimensional object printer, the first data file including data corresponding to an interior surface and an exterior surface of the 3D object, comparing the first data file with a second data file, the second data file being used to operate the three-dimensional object printer to produce the 3D object, identifying differences between the first data file and the second data file, and identifying a process to rectify a defect on the 3D object based on the identified differences to enable evaluation of the production of the 3D object by the three-dimensional object printer.

A three-dimensional object printer incorporates the method that evaluates a three-dimensional (3D) object produced by a three-dimensional object printer. The three-dimensional object printer includes a planar member, at least one ejector configured to eject material to produce a three-dimensional (3D) object on the planar member, a scanner configured to generate a first data file corresponding to the 3D object on the planar member, the first data file including data corresponding to an interior surface and an exterior surface of the 3D object, and a controller operatively connected to the at least one ejector and the scanner. The controller is configured to: operate the at least one ejector with reference to a second data file to produce the 3D object, compare the first data file with the second data file, identify differences between the first data file and the second data file, and identify a process to rectify a defect on the 3D object based on the identified differences to enable evaluation of the production of the 3D object by the three-dimensional object printer.

BRIEF DESCRIPTION OF THE DRAWINGS

The foregoing aspects and other features of a printer cleaning device that enables the removal of a material are explained in the following description, taken in connection with the accompanying drawings.

DETAILED DESCRIPTION

Figure 1:
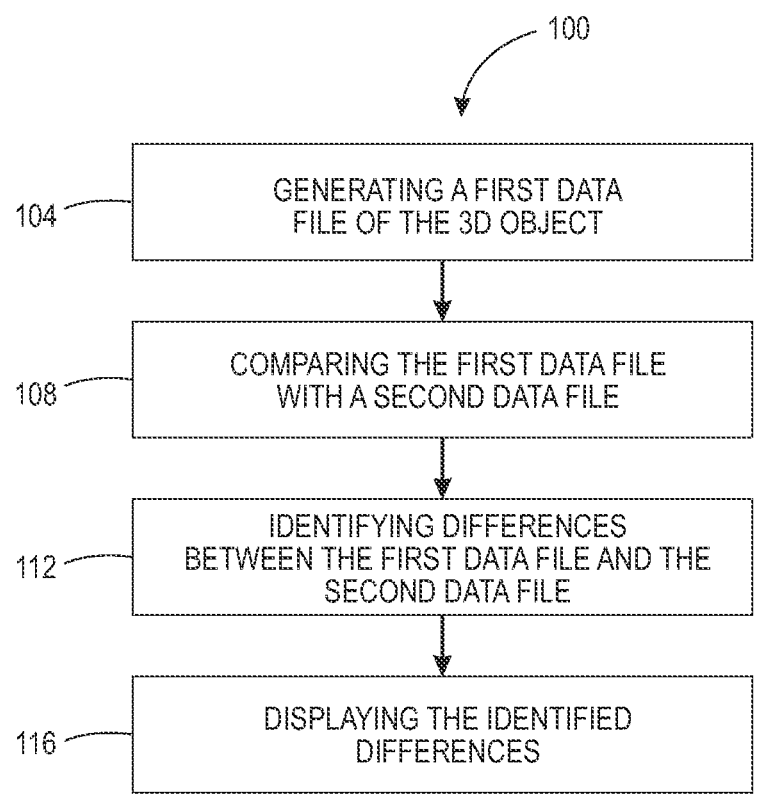
FIG. 1 illustrates a flow diagram of an exemplary method for verifying a 3D object produced by a three-dimensional object printer.

For a general understanding of the present embodiments, reference is made to the drawings. In the drawings, like reference numerals have been used throughout to designate like elements.

FIG. 1 illustrates a flow diagram of an exemplary method for verifying a 3D object produced by a three-dimensional object printer. The method 100 begins with generating a first data file of the printed 3D object. The first data file includes data corresponding to the interior surface of the printed 3D object and the exterior surface of the printed 3D object (block 104). In one example, the first data file contains geometric descriptions of the printed 3D object and defines the space occupied by the printed 3D object. In one embodiment, the first data file is produced by scanning the printed 3D object. For example, the data corresponding to the exterior surface of the printed 3D object can be obtained by scanning the printed 3D object using technologies such as, but not limited to, a scanner or the like. The scanner can include, for example, a light source and a light detector to generate a signal corresponding to an intensity of light reflected by the printed 3D object. In another example, the data corresponding to the interior surface of the printed 3D object can be obtained by scanning the printed 3D object using technologies that can penetrate and scan the interior surface of the printed 3D object. Example of such technologies that can penetrate and scan the interior surface of an object include, but are not limited to, x-ray, ultrasound, MRI, or the like. The reader should understand that while a scanner is used to scan the printed 3D object, any other suitable techniques can also be used to generate a first file data containing a description of the printed 3D object. For example, the data corresponding to the interior surface of the printed 3D object can be obtained by identifying features in the printed 3D object or in a 3D virtual model used as a reference to produce the printed 3D object, wherein the features are not be visible using scanners or other suitable technologies.

The first data file is then compared to a second data file (block 108). In one embodiment, the second data file is an input design file such as a CAD file describing a 3D virtual model. The second data file can be used to operate the three-dimensional object printer to produce the printed 3D object. In another embodiment, the second data file is obtained from scanning an image or a 3D model and converting the scanned image or scanned 3D model into data representing the geometric descriptions of the image or the 3D model.

In one embodiment, the second data file includes data representing indicias that are embedded on the surface of the 3D virtual model. Examples of indicias include, but are not limited to, datum marks or the like. When the printed 3D object is produced by the 3D object printer using the second data file, the indicias are formed and embedded on the printed 3D object. When the printed 3D object is scanned, the indicias on the printed 3D object are recorded and included in the generated first data file. The indicias can be used to align the position and orientation of the printed 3D object described in the first data file with the 3D virtual model described in the second data file. In another embodiment, a best fit of the data of the first data file with the data of the second data file is used to align the position and orientation of the printed 3D object with the 3D virtual model described in the second data file.

Differences between the first data file and the second data file are then identified based on the comparison of the first data file with the second data file (block 112). In one embodiment, the method 100 detects a portion of the 3D virtual object defined in the second data file that is missing from the printed 3D object defined in the first data file or a portion of the printed 3D object defined in the first data file that is missing in the 3D virtual model defined in the second data file. Accordingly, the method 100 identifies the difference in distance between the position for portion of the printed 3D object defined in the first data file and the position for portion of the 3D virtual model defined in the second data file. In another embodiment, the method 100 detects a portion of the 3D virtual object defined in the second data file that is missing from the printed 3D object defined in the first data file or a portion of the printed 3D object defined in the first data file that is missing in the 3D virtual model defined in the second data file. Accordingly, the method 100 identifies the difference in volume between the position for portion of the 3D object defined in the first data file and the position for portion of the 3D virtual model defined in the second data file.

The identified differences between the first data file and the second data file are then displayed (block 116). These differences can enable the evaluation of the production of the 3D object by the three-dimensional object printer. In one example, these differences can be compared to a pass or fail criteria for part screening. For example, the differences can be compared to a predetermined tolerance level and the scanned 3D object passes the evaluation if the differences are within the predetermined tolerance level to allow the method 100 to evaluate any level of details. In one example, if the differences are within 50 microns, then the scanned 3D object has passed the criteria. The reader should understand that the criteria can encompass any measurement such as, but not limited to, dimensional differences between the scanned 3D object and the 3D virtual object, volume differences, mass differences, a combination thereof, or the like. In another example, these differences can be presented to the user graphically, the difference areas can be highlighted, and the severity of the differences can be highlighted. In another example, these differences can be used to prepare input data for post-printing operations such as machining, polishing, additional 3D printing, repairing the production process to correct defects, or the like. For example, the method 100, in an iterative process, can return the defective 3D object to the manufacturing process and determine how to rectify the defect. If the defective 3D object has material missing, the method 100 can send the 3D object through a printing process to print the missing material on the 3D object. If the defective 3D object has excess material, the method 100 can send the 3D object through a cleanup process to remove the excess material from the 3D object. The reader should understand that the method 100 can be configured to automatically identify the defect, identify a process to rectify the defect, and after the action is performed on the 3D object, the method 100 can iteratively scan and evaluate the 3D object again. These differences be also be used for diagnostic purposes to identify potential problems with the 3D object printer. For example, based on the differences identified, warning messages can be provided to the user directing the user to the location and nature of defect with the 3D object printer or data can be sent to the 3D object printer to initiate automated corrective actions.

Figure 2:
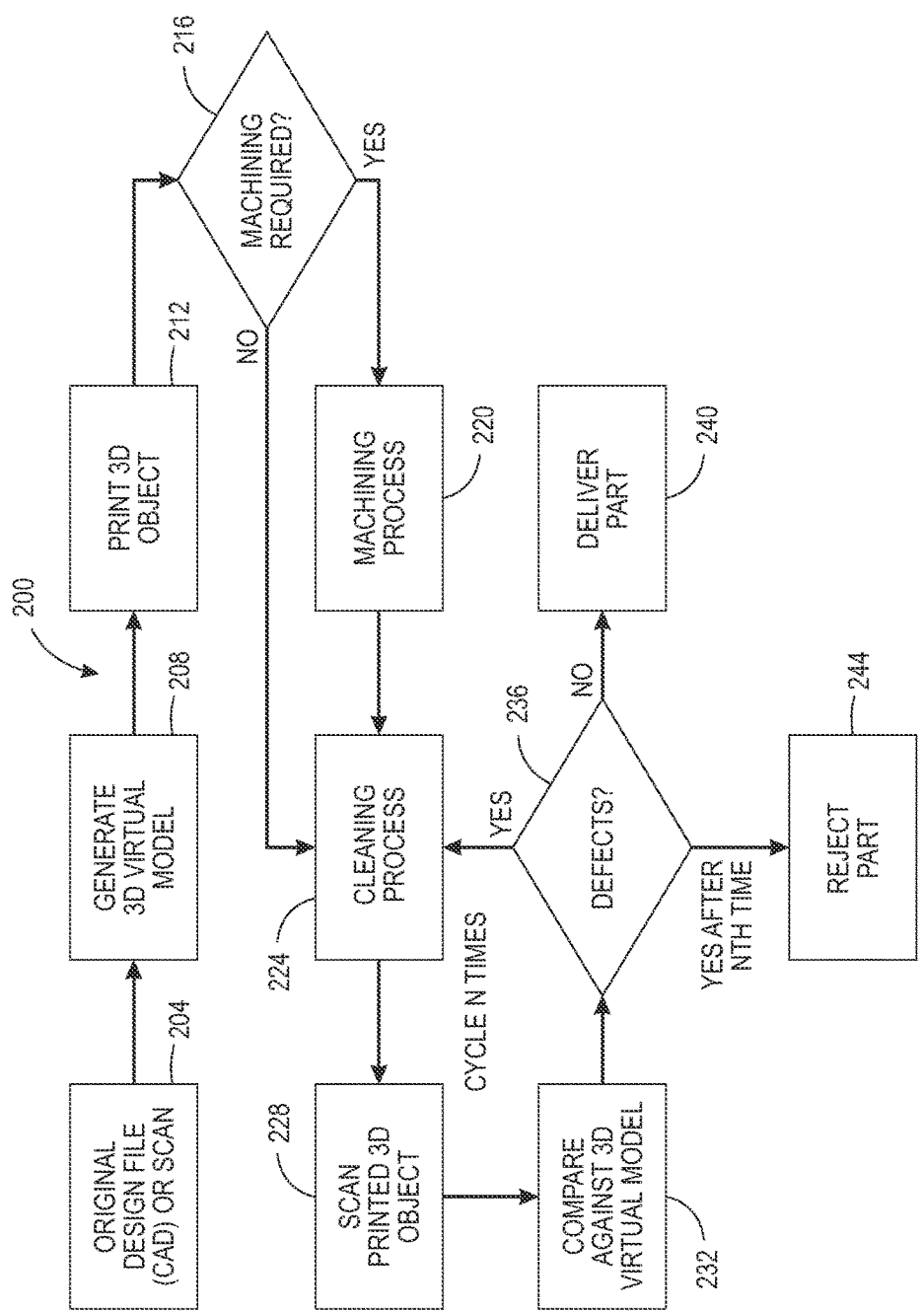
FIG. 2 illustrates a flow diagram of another exemplary method for verifying a 3D object produced by a three-dimensional object printer.

FIG. 2 illustrates a flow diagram of another exemplary method for verifying a 3D object produced by a three-dimensional object printer. The method 200 receives a second data file describing geometric dimensions for a 3D virtual model. The second data file can be obtained from a CAD file, from scanning a 3D object or an image, or the like (block 204). The method then generates a 3D virtual model based on the second data file (block 208). The second data file is then used to print a 3D object using a 3D object printer (block 212). In one example, a controller controls an ejector to produce the 3D object. The ejector ejects material to produce the 3D object on a planar member. The method determines whether machining is required for the printed 3D object (block 216). If machining is required, then the printed 3D object goes through a machining process (block 220). If machining is not required, then the printed 3D object goes through a cleaning process (block 224). The printed 3D object is then scanned using a scanner to generate a first data file (block 228). The controller then compares the first data file defining the printed 3D object with the second data file defining the 3D virtual model (block 232). The controller identifies defects in the printed 3D object based on the comparison (block 236). If defects are identified, then the printed 3D object goes through a cleaning process again (block 224). In one example, the loop of cleaning, scanning, comparing, and identifying defects (blocks 224, 228, 232, and 236) is performed only a predetermined number of times if defects are identified after each comparison (block 232). For example the printed 3D object is cleaned, scanned, and compared (blocks 224, 228, 232) against the 3D virtual model a maximum of 3 times if defects are found all those three times. After the predetermined number of times, the printed 3D object is rejected (block 244). If no defect is found by the predetermined number of times, then the printed 3D object is delivered (block 240). For example, if the printed 3D object is found to have defects twice (block 236) and after the third time of cleaning, scanning, and comparing (blocks 224, 228, 232), no defects are found in the printed 3D object (block 236), then the printed 3D object will be delivered (block 240).

Figure 3:
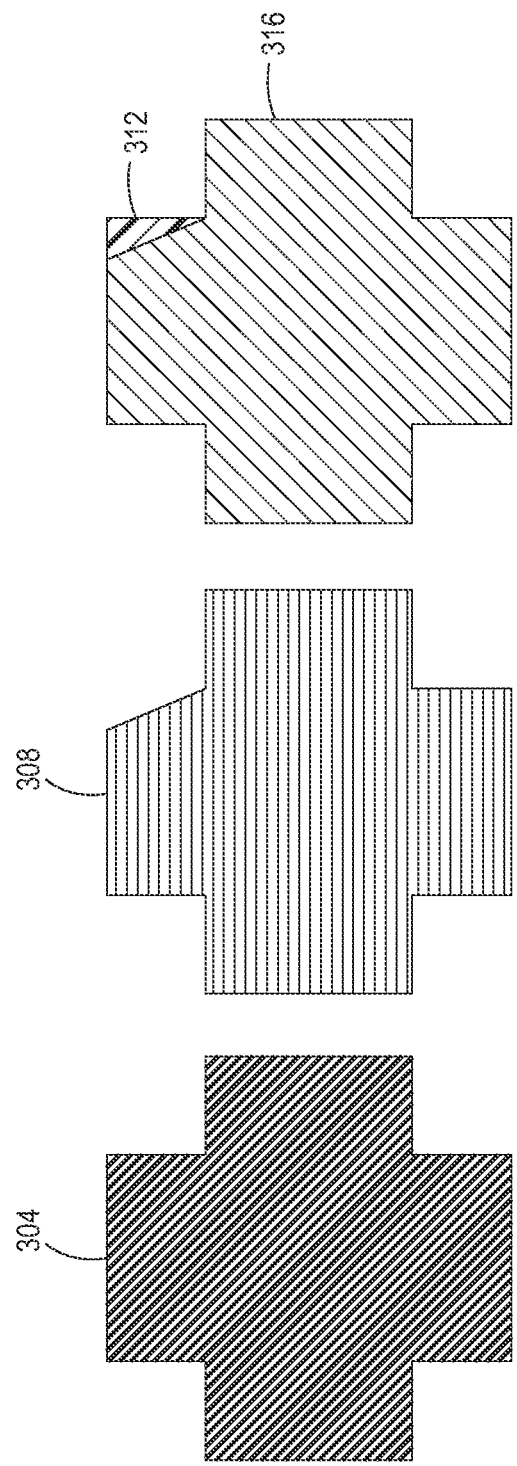
FIG. 3 illustrates an exemplary comparison of a printed 3D object and a 3D virtual model for verifying the printed 3D object produced by a three-dimensional object printer.

FIG. 3 illustrates an exemplary comparison of a printed 3D object 308 and a 3D virtual model 304 for verifying the printed 3D object produced by a three-dimensional object printer. A 3D virtual model 304 defined in the second data file is compared with the printed 3D object 308 defined in the first data file. The difference between the 3D virtual model 304 and the printed 3D object 308 is represented by a portion 312 that is missing and a portion 316 that is the is present in both the 3D virtual model 304 and the printed 3D object 308.

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for evaluating a three-dimensional (3D) object produced by a three-dimensional object printer comprising:
    generating with a scanner image data of the 3D object produced by the three-dimensional object printer in a first data file, the image data of the 3D object corresponding to an interior surface and an exterior surface of the 3D object;
    operating the three-dimensional object printer with data in a second data file that corresponds to the 3D object to produce the 3D object and to form indicia on a surface of the 3D object during production of the 3D object prior to generating the image data in the first data file with the scanner;
    aligning a position and orientation of the 3D object in the image data of the first data file with a position and orientation of the 3D object in the second data file with reference to the image data of the indicia on the 3D object in the first data file;
    comparing the image data of the 3D object in the first data file with the data corresponding to the aligned 3D object in the second data file;
    identifying differences between the image data corresponding to the interior surface and the exterior surface of the 3D object in the first data file and the data corresponding to the aligned 3D object in the second data file;
    performing a process to add material to or remove material from the 3D object to rectify a defect on the 3D object with reference to the identified differences;
    generating with the scanner image data of the 3D object in a third data file after the process to rectify the defect is performed, the image data corresponding to the interior surface and the exterior surface of the 3D object after the process to rectify the defect is performed;
    aligning a position and orientation of the 3D object in the third data file with a position and orientation of the 3D object in the second data file with reference to the image data of the indicia on the 3D object in the third data file;
    comparing the image data of the 3D object in the third data file with the data corresponding to the aligned 3D object in the second data file;
    identifying differences between the image data corresponding to the interior surface and the exterior surface of the 3D object in the third data file and the data corresponding to the aligned 3D object in the second data file;
    comparing the identified differences to a predetermined threshold;
    performing the process to add material to or remove material from the 3D object to rectify the defect on the 3D object with reference to the identified differences in response to the identified differences being greater than the predetermined threshold; and
    continuing to generate the image data for the third data file, aligning the position and orientation of the 3D object in the third data file with the position and orientation of the aligned 3D object in the second data file, comparing the image data of the 3D object in the third data file with the data corresponding to the aligned 3D object in the second data file, identifying differences between the image data of the 3D object in the third data file and the data of the aligned 3D object in the second data file, comparing the identified differences to the predetermined threshold, and performing the process to add material to or remove material from the 3D object to rectify the defect on the 3D object until the identified differences are less than the predetermined threshold or until the process to rectify the defect has been performed a predetermined number of times.

2. The method of claim 1, the alignment of the image data of the 3D object in the first data file with the data corresponding to the 3D object in the second data file further comprising:
    correlating image data in the first data file corresponding to the indicia formed on the surface of the 3D object with the data in the second data file used to form the indicia to align the position and orientation of the 3D object in the first data file with the position and orientation of the 3D object in the second data file.

3. The method of claim 1 further comprising:
    identifying a best fit of the image data in the first data file with the data in the second data file to align the position and orientation of the 3D object in the first data file with the position and orientation of the 3D object in the second data file.

4. The method of claim 1, the generation of the image data in the first data file with the scanner further comprising:
    scanning the interior surface of the 3D object with at least one of an x-ray, a ultrasound, and a MRI to generate the image data in the first data file.

5. The method of claim 1, the generation of the image data in the first data file with the scanner further comprising:
    scanning the exterior surface of the 3D object with a three dimensional scanner having at least one light source and at least one light detector for generating a signal corresponding to an intensity of light reflected by the 3D object.

6. The method of claim 1 further comprising:
    detecting a portion of the 3D object corresponding to image data in the first data file where the data in the second data file does not have a corresponding portion; and
    identifying a difference in distance between a position for the portion of the 3D object in the first data file and a position for the portion missing from the 3D object in the second data file.

7. The method of claim 1 further comprising:
    detecting a portion of the 3D object corresponding to image data in the first data file where data in the second data file does not have a corresponding portion; and
    identifying a difference in volume between the portion of the 3D object in the first data file and the portion missing from the 3D object in the second data file.

8. A three-dimensional object printer comprising:
    a planar member;

at least one ejector configured to eject material to produce a three-dimensional (3D) object on the planar member;

a scanner configured to generate image data of the 3D object for a first data file, the image data corresponding to an interior surface and an exterior surface of the 3D object; and a controller operatively connected to the at least one ejector and the scanner, the controller being configured to:
  operate the scanner to generate the image data of the 3D object for the first data file;
  operate the at least one ejector with reference to a second data file to produce the 3D object;
  operate the at least one ejector with reference to the second data file to form indicia on a surface of the 3D object during production of the 3D object;
  align a position and orientation of the 3D object in the image data of the first data file with a position and orientation of the 3D object in the second data file with reference to the image data of the indicia on the 3D object in the first data file;
  compare the image data of the 3D object in the first data file received from the scanner with the data corresponding to the aligned 3D object in the second data file;
  identify differences between the image data corresponding to the interior surface and the exterior surface of the 3D object in the first data file and the data corresponding to the aligned 3D object in the second data file;
  perform a process to add material to or remove material from the 3D object to rectify a defect on the 3D object with reference to the identified differences;
  generate with the scanner image data of the 3D object in a third data file after the process to rectify the defect is performed, the image data corresponding to the interior surface and the exterior surface of the 3D object after the process to rectify the defect is performed;
  align a position and orientation of the 3D object in the third data file with the position and orientation of the 3D object in the second data file with reference to the image data of the indicia on the 3D object in the third data file;
  compare the image data of the 3D object in the third data file with the data corresponding to the 3D object in the second data file;
  identify differences between the image data corresponding to the interior surface and the exterior surface of the 3D object in the third data file and the data corresponding to the 3D object in the second data file;
  compare the identified differences to a predetermined threshold;
  perform a process to add material to or remove material from the 3D object to rectify the defect on the 3D object with reference to the identified differences in response to the identified differences being greater than the predetermined threshold; and
  continue to operate the scanner to generate the image data for the third data file, aligning the position and orientation of the 3D object in the third data file with the position and orientation of the 3D object in the second data file, comparing the image data of the 3D object in the third data file with the data corresponding to the aligned 3D object in the second data file, identifying differences between the image data of the 3D object in the third data file and the data of the aligned 3D object in the second data file, comparing the identified differences to the predetermined threshold, and performing the process to add material to or remove material from the 3D object to rectify the defect on the 3D object until the identified differences are less than the predetermined threshold or until the process to rectify the defect has been performed a predetermined number of times.

9. The printer of claim 8 further comprising:
  correlate image data in the first data file corresponding to the indicia formed on the surface of the 3D object with the data in the second data file used to form the indicia to align the position and orientation of the 3D object in the first data file with the position and orientation of the 3D object in the second data file.

10. The printer of claim 8, the controller being further configured to:
  identify a best fit of the image data in the first data file with the data in the second data file to align the position and orientation of the 3D object in the first data file with the position and orientation of the 3D object in the second data file.

11. The printer of claim 8, the scanner further comprising:
  at least one of an x-ray, a ultrasound, and a MRI to generate image data in the first data file that corresponds to the interior surface of the 3D object.

12. The printer of claim 8, the scanner further comprising:
  at least one light source and at least one light detector for generating a signal corresponding to an intensity of light reflected by the 3D object to generate image data in the first data file that corresponds to the exterior surface of the 3D object.

13. The printer of claim 8, the controller being further configured to:
  detect a portion of the 3D object corresponding to image data in the first data file where the data in the second data file does not have a corresponding portion; and
  identify a difference in distance between a position for the portion of the 3D object in the first data file and a position for the portion missing from the 3D object in the second data file.

14. The printer of claim 8, the controller being further configured to:
  detect a portion of the 3D object corresponding to image data in the first data file where the data in the second data file does not have a corresponding portion; and
  identify a difference in volume between the portion of the 3D object in the first data file and the portion missing from the 3D object in the second data file.

* * * * *